United States Patent

Haumiller

[15] 3,664,484

[45] May 23, 1972

[54] ORIENTING WORKPIECES

[72] Inventor: Clifford A. Haumiller, 960 East Chicago Street, Elgin, Ill. 60120

[22] Filed: Oct. 2, 1970

[21] Appl. No.: 77,529

[52] U.S. Cl. ........................................198/33 AA, 221/159
[51] Int. Cl. ..........................................................B65g 47/24
[58] Field of Search ....................198/33 R, 33 AA; 221/159; 209/89, 108

[56] References Cited

UNITED STATES PATENTS 3,260,347  7/1966  Barnes ..............................198/33 AA Primary Examiner—Richard E. Aegerter
Attorney—Walter L. Schlegel, Jr.

[57] ABSTRACT

A conventional device for continuously delivering sleeves is arranged to deliver them to a delivery station or shelf of an orienter. The sleeves are delivered randomly on their sides or with their thin-section ends upwardly or with their thick-section ends upwardly, and the orienter comprises a rotor which during normal operation of the system rotates continuously and comprises a plurality of spaced arcuate fingers defining recesses complementary to the outside diameters of the sleeves and adapted to receive the same as they are delivered to the delivery station. The rotor comprises a plurality of independent clamps above respective recesses, each clamp having a moveable jaw adapted to automatically enter the thin-section end of a sleeve and clamp it against the rotor until the clamped sleeve passes over a delivery station or shelf whereupon the moveable jaw is automatically withdrawn from the sleeve, and the finger engaged therewith squeezes the sleeve against a stationary pick-off cam or finger to urge the sleeve, with its thin-section up, into a chute. If a sleeve is delivered, on its side or with its thick-section end up, to the delivery shelf the moveable jaw cannot enter the sleeve and as the moveable jaw moves downwardly it ejects the sleeve through a gap between the shelves downwardly into the feeder which redelivers the sleeve to the delivery shelf. If the chute, for any reason, fails to be emptied as fast as sleeves are delivered to the chute by the rotor, the jamming action of the last sleeve in the chute with a sleeve carried by the rotor causes the rotor to stop rotating, and a slip clutch is provided so that the rotor motor may continue to operate until the chute is open to receive one or more sleeves whereupon the rotor again rotates until the chute is again filled. While the rotor is stopped during such a jamming action, sleeves delivered to the delivery shelf by the feeder may fall off the delivery shelf back into the feeder.

9 Claims, 7 Drawing Figures

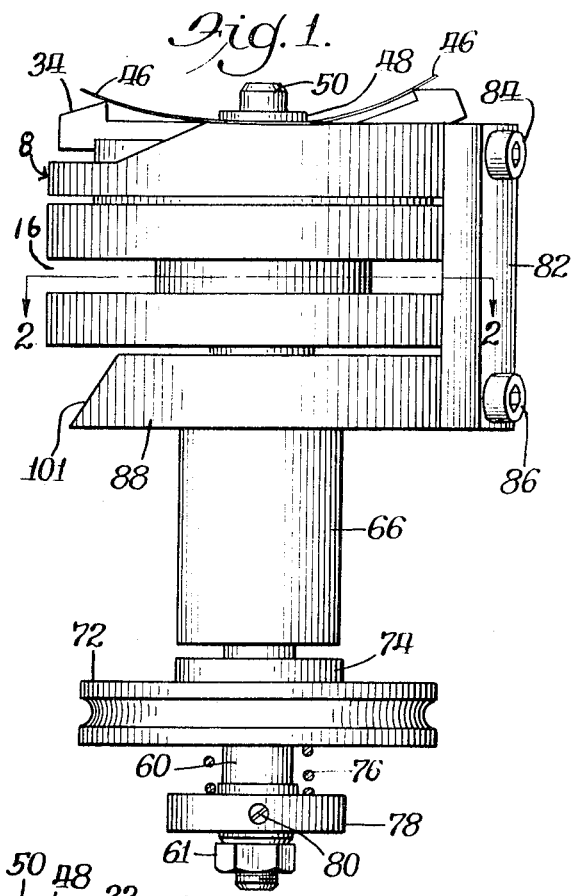
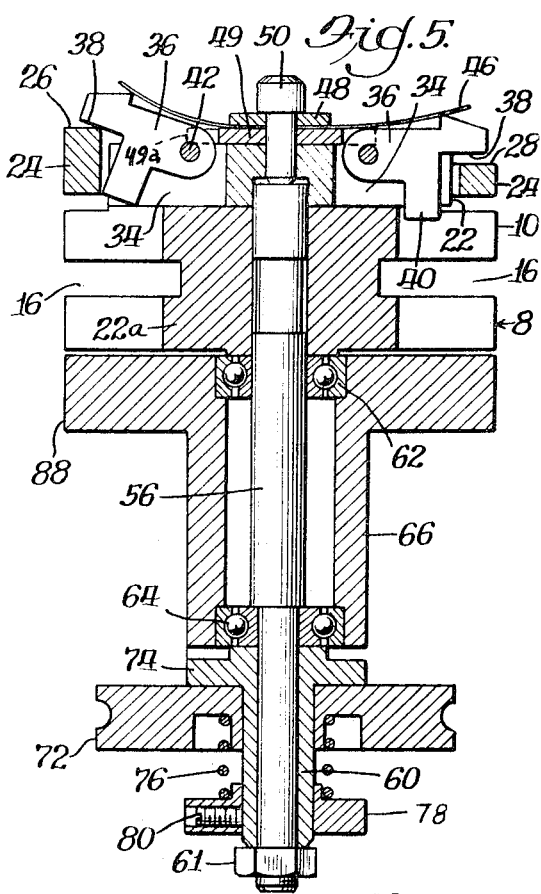
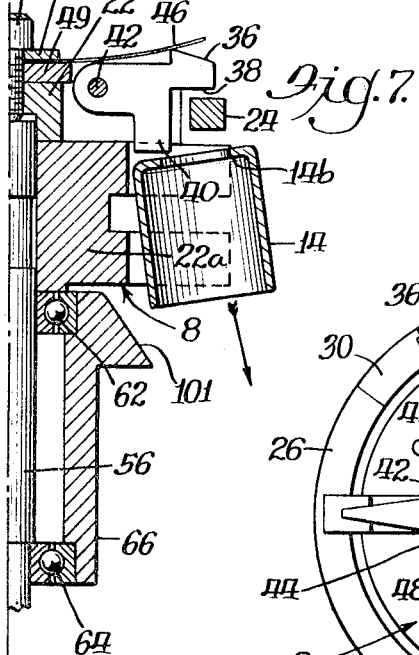
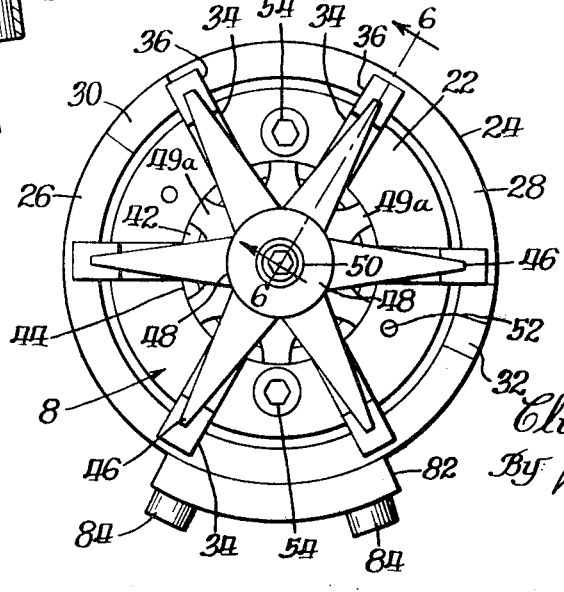
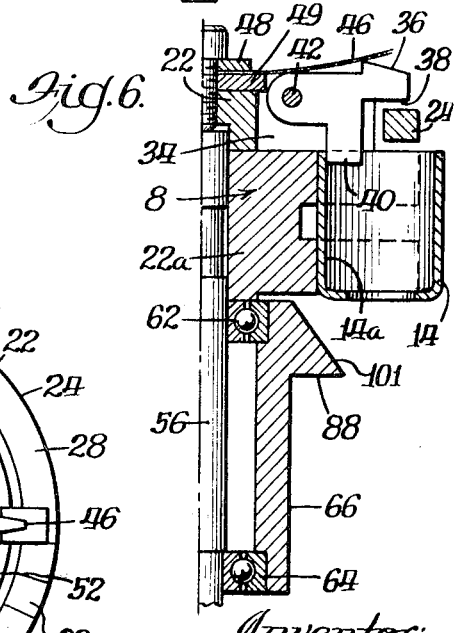

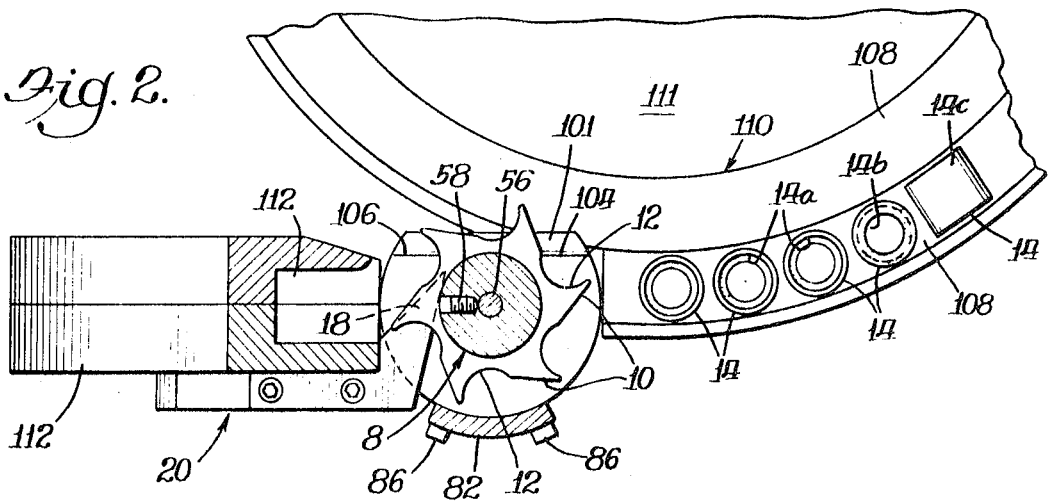
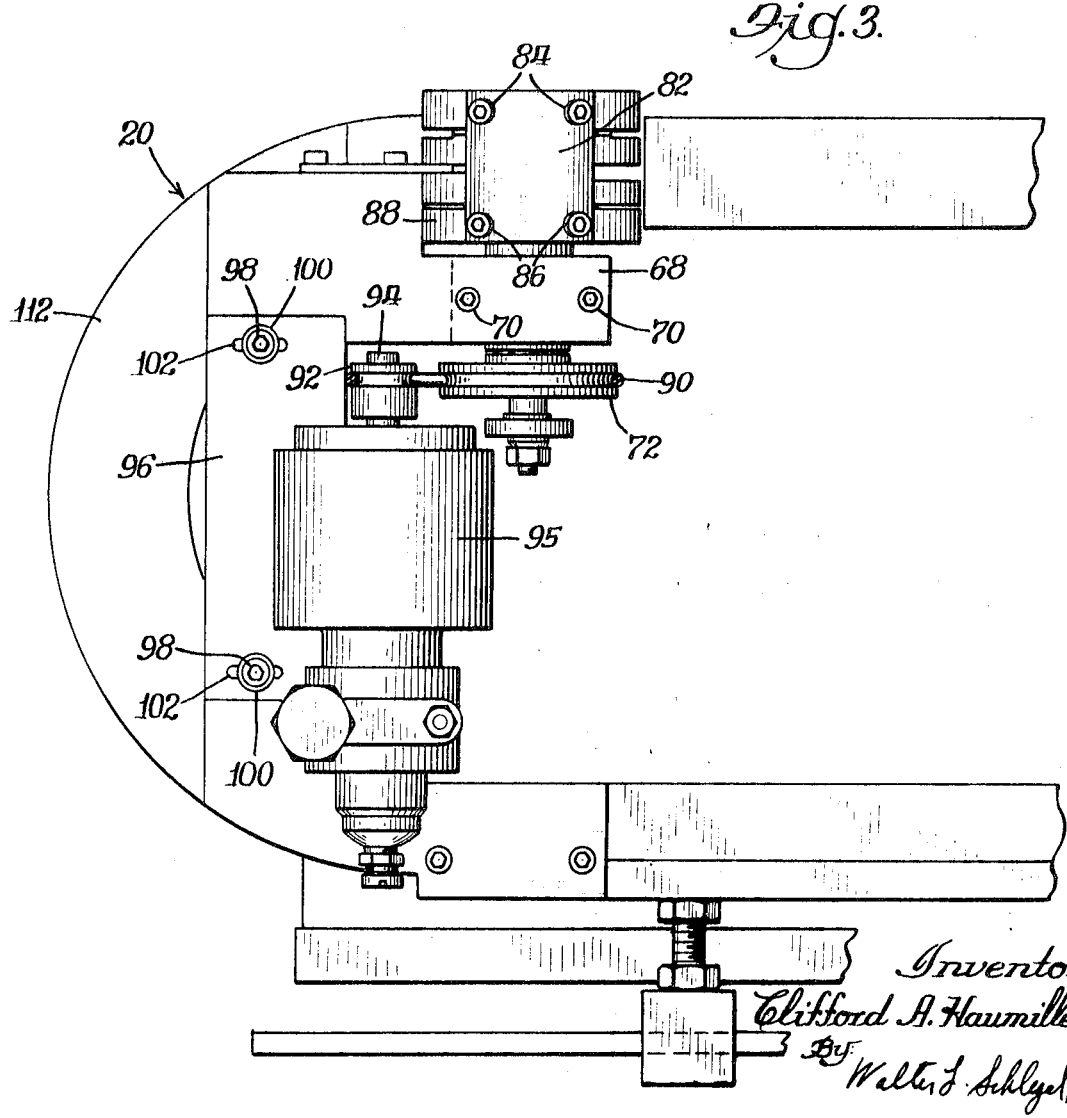

ORIENTING WORKPIECES

This invention relates to a system for orienting sleeves continuously delivered by a conventional feeder in a random manner on their sides or with the correct ends up or the incorrect ends up.

In order that such sleeves may be efficiently assembled with related parts, such as, for example, pressure containers of aerosol bombs, it is necessary that the sleeves be delivered to the assembly device with their corresponding ends all facing in the same direction, inasmuch as each sleeve has a larger-diameter hole in one end and a smaller-diameter hole or no hole in the other end.

A conventional feeder for such sleeves such as, for example, a vibratory feeder, delivers the sleeves randomly on their sides or more usually with either end up along a spiral ledge which merges with the bottom of a bowl or hopper and ascends along its inner perimeter in a spiral path to the top of the bowl whereat the sleeves are delivered with either end up or occasionally on their sides. The sleeves travel upwardly along said spiral ledge due to vibration of the bowl as by a vibratory motor attached to the bottom thereof, as is well known in the prior art.

A primary object of the present invention is to properly orient the sleeves delivered by such a feeder so that the sleeves enter a discharge chute with the larger-diameter holes of said sleeves facing upwardly which chute delivers the sleeves to the assembly machine.

A more specific object of the invention is to provide a rotor with arcuate recesses which receive the sleeves as they are delivered by the feeder and transport to the discharge chute those sleeves delivered by the feeder with their larger-diameter holes up. The other sleeves are rejected by the rotor and fall back into the feeder for redelivery to the rotor.

Still another object of the invention is to stop the rotor when the chute is full without the necessity of stopping the drive motor for the rotor so that when the chute clears to accept one or more of the sleeves the rotor immediately beings to rotate again.

The foregoing and other objects and advantages of the invention will become apparent from a consideration of the following specification and the accompanying drawings, wherein:

FIG. 1 is a side elevational view of the rotor and its support bearing;

FIG. 2 is a top view of the rotor in section on line 2—2 of FIG. 1 and shown in assembled position with respect to the sleeve feeder and the discharge chute;

FIG. 3 is a side elevational view of the assembly shown in FIG. 2;

FIG. 4 is a top plan view of the rotor;

FIG. 5 is a central vertical sectional view of the rotor;

FIG. 6 is a sectional view on line 6—6 of FIG. 4 showing a correctly positioned sleeve gripped by a jaw of the rotor; and FIG. 7 is a sectional view corresponding to FIG. 6 showing the jaw rejecting an incorrectly positioned sleeve.

Describing the invention in detail the novel orienting system or machine comprises a rotor generally designated 8 comprising spaced arcuate fingers 10 each defining a recess 12 complementary in shape to the outer diameters of the sleeves 14 (FIGS. 2, 6, and 7) to be oriented. The fingers 10 are provided with aligned, substantially horizontal slots 16 to receive a pick-off cam or finger 18 (FIG. 2) mounted on the stationary framework 20 of the machine for a purpose hereinafter described.

The rotor also comprises a smaller-diameter portion 22 extending upwardly through a central opening of a substantially annular cam ring 24, the top surface of which comprises a high land 26 and a low land 28 connected thereto by spaced sloping lands 30 and 32 (FIG. 4).

The rotor portion 22 comprises a plurality of spaced slots 34 extending radially inwardly from the radially outer perimeter of portion 22 toward its vertical rotational axis. Received within respective slots 34 are clamp arms 36, each having a cam surface 38 to ride on top of the cam ring 24 and having a clamp jaw 40 adapted to enter and clamp a sleeve 14 against rotor portion 22 if the sleeve 14 enters a recess 12 with the sleeve having its thin-wall section up (FIG. 6) as hereinafter described.

It will be understood that when the thin wall section 14a of a sleeve 14 faces upwardly (FIGS. 2 and 6) the larger-diameter hole of the sleeve is at its upper end and conversely when the thick wall-section 14b of a sleeve 14 faces upwardly (FIG. 7 and 2) the smaller-diameter hole of the sleeve is at its upper end. It will also be understood that if the thick wall section is so thick as to extend radially entirely across the inner diameter of the sleeve there will be no hole at that end.

The arms 36 are pivoted to the rotor adjacent their radially inner ends by a pivot ring 42 passing through complementary holes of the jaws and retained within an annular recess 44 in the top of the rotor as hereinafter described. Flat springs 46 are preferably interconnected at their radially inner ends and clamped against the top of the rotor portion 22 by washers 48 and 49 and a cap screw 50, each spring 46 slideably bearing against an arm 36 to resiliently bias it downwardly with its slot 34. Washer 49 as best seen in FIG. 4 has radial arms 49a holding the ring 42 in the recess 44.

The rotor portion 22 is preferably separable from a larger-diameter portion 22a of the rotor and is secured thereto as by dowels 52 and cap screws 54 as seen in FIG. 4.

The rotor 8 is rotated by a drive shaft or spindle 56 secured to the larger-diameter portion 22a of the rotor as by a cap screw 58. A sleeve 60 (FIG. 5) on the shaft 56 is engaged by a nut 61 threaded on the shaft to tighten the rotor against top and bottom ball bearings 62 and 64 within a bearing sleeve 66 clamped within a clamp 68 (FIG. 3) by cap screws 70, said clamp 68 being attached to the stationary framework 20 of the machine. The sleeve 60 rotates with the shaft 56 and with the inner races of bearings 62 and 64.

A pully 72 is slideably seated against a flange 74 of the sleeve 60 and is frictionally engaged therewith by a compression spring 76 adjustibly compressed by an annular spring seat 78 anchored in adjusted position to the sleeve 60 by a set screw 80.

It may be noted that the cam ring 24 is anchored to a bracket or plate 82 (FIG. 3) by capscrews 84, and the bracket 82 is anchored by cap screws 86 to a flange 88 of the bearing sleeve 66.

The pulley 72 is driven by an O-ring belt 90 (FIG. 3) which is in turn driven by a drive pulley 92 keyed on the drive shaft 94 of a conventional torque motor 95 which may be energized by any source of power such as compressed air or electricity. The motor is mounted on a bracket 96 which is adjustably anchored to the framework 20 as by capscrews 98 and washers 100, the capscrews extending through slots 102 of the bracket 96 so that tension on belt 90 may be adjusted as the motor 95 is anchored to the framework 20.

The flange 88 is sheared off as at 101 at the side thereof remote from the bracket plate 82 to afford spaced shelves 104 and 106 as best seen in FIG. 2. The shelf 104 is adapted to receive sleeves 14 from a spiral ramp 108 of a conventional vibratory feeder 110 which continuously delivers sleeves randomly, either end up, or on their sides, to the shelf 104.

The sheared portion 101 of flange 88 slopes downwardly over the feeder 110 to define a sloping guide surface for rejected sleeves so that they are directed back into the hopper 111 (FIG. 2) of the feeder since such sleeves are not gripped by jaws 40.

The shelf 106 receives sleeves delivered by rotor 8, and the sleeves are released by their respective jaws 40 as the arms 36 ride up sloping land 30 to high land 26, whereupon each sleeve is squeezed against the pick-off finger 18 by a rotor finger 10 to discharge the sleeve as hereinafter described.

In operation of the novel system, the sleeves 14 are continuously delivered by feeder 110 to delivery shelf 104 which is the delivery station at which sleeves 14 are delivered to the rotor recesses 12, and the shaft 56 rotates continuously at an adjustable rate of preferably about 60 R.P.M., and the feeder 110 delivers sleeves 14 to the delivery shelf at a rate such that one sleeve 14 is urged into each recess 12 as the arm 36 above that recess rides down land 32 of cam ring 24 so that the jaw 40 of said arm rotates downwardly to clamp the sleeve 14 against the rotor portion 22 which functions as a jaw against which the sleeve 14 is clamped by the related moveable jaw 40 if the sleeve is positioned with its thin-section end 14a up as shown in FIG. 6.

If the sleeve 14 is positioned with its thick-section end 14b up as shown in FIG. 7, the jaw 40 as it rotates downwardly under the action of its spring 46 ejects the sleeve back into the feeder 110 through a gap defined by the sheared portion 101 of the flange 88. If a sleeve 14 is delivered on its side as at 14c (FIG. 2) in a horizontal position to the rotor, that sleeve 14 cannot enter a recess 12 and is impelled by the rotation of the rotor back into the feeder. A rejected sleeve after it falls through the gap back into the feeder 110 is redelivered thereby to shelf 104.

Each sleeve 14 which is clamped by a jaw 40 against rotor portion 22 is carried across said gap to the discharge station or shelf 106 and is deposited thereon as its related arm 36 moves upwardly along the land 30. The clamped sleeve 14 which is thus released from its jaw 40 is carried by a rotor finger 10 against the pick-off finger 18 and is squeezed thereby into a chute 112 which retains the sleeve 14 in its oriented position as it is delivered by the chute to a machine (not shown) for attaching the sleeve to an aerosol container.

If sleeves 14 for any reason are not discharged by the chute 112 as rapidly as they are delivered thereto by the rotor 8 so that a sleeve 14 delivered to shelf 106 is urged by related rotor finger 10 against a sleeve which cannot enter the chute because it is full, the rotor stops rotating as the pully 72 slides against the flange 74 which thus functions as a slip clutch until the chute is again clear to accept one or more sleeves 14.

What is claimed:

1. In a machine of the class described, a delivery station, means for delivering to said station articles to be oriented, a discharge station, a plurality of spaced means for clamping said articles, respectively, in a certain position thereof at said delivery station and for rejecting said articles in another position thereof at said delivery station, means for moving said clamping means from said delivery station to said discharge station, and means for releasing said clamping means at said discharge station, said moving means being characterized by a rotor mounted for rotation on a substantially vertical axis.

2. A machine according to claim 1 wherein said releasing means are characterized by cam means on a stationary part of the machine.

3. In a machine of the class described, a delivery station, means for delivering to said station articles to be oriented, a discharge station, a plurality of spaced means for engaging said articles, respectively, in a certain position thereof at said delivery station and for rejecting said articles in another position thereof at said delivery station, means for moving said engaging means from said delivery station to said discharge station, and means for releasing said engaging means at said discharge station, said engaging means being characterized by a plurality of spaced clamps each having a movable jaw and the releasing means are characterized by cam means on the jaw and on a stationary part of the machine.

4. In a system of the class described for orienting sleeves having a larger-diameter hole in corresponding ends thereof and having smaller-diameter holes or no holes in the opposite ends thereof, a rotor having a plurality of fingers defining arcuate recesses complementary to the outer diameters of said sleeves, radial slots in the top of said rotor above respective recesses, arms pivoted at their radially inner ends to the rotor and received within respective slots, a stationary cam ring surrounding the rotor and having a high land and spaced downwardly sloping lands extending downwardly therefrom and engageable with the radially outer ends of said arms, each arm having on its lower edge a jaw adapted to clamp one of said sleeves to said rotor in a related recess, spring means carried by the rotor for biasing said arms downwardly in said slots, a delivery shelf below one of said downwardly sloping lands, feeding means extending from a point below said shelves upwardly to said delivery shelf for delivering said sleeves continuously thereto one at a time with either end up randomly, a discharge shelf below the other of said sloping lands, the larger-diameter holes in said corresponding ends of said sleeves being large enough to receive said jaws, and said opposite ends of said sleeves being incapable of receiving said jaws, whereby a sleeve with its larger-diameter hole facing downwardly as it passes onto said delivery shelf is urged downwardly back into said feeding means for redelivery to said delivery shelf.

5. A system according to claim 4 wherein a chute is provided to receive said sleeves from the discharge shelf and wherein means are provided to cooperate with said fingers for urging the sleeves from the discharge shelf into the chute with the larger-diameter holes of the sleeves facing upwardly.

6. A system according to claim 5 wherein a power motor is connected to the rotor for rotating it, and wherein a slip clutch is provided in the connection between the motor and the rotor, whereby when the chute is full, the clutch permits the rotor to remain stationary while the motor remains energized.

7. In a machine for orienting sleeves, a feeder which continuously delivers said sleeves one at a time with either end up, randomly, each sleeve having a relatively thin section end and a relatively thick section end, a rotor having a plurality of spaced fingers moveable in a rotational path a portion of which is directly above a hopper of the feeder, a stationary shelf below said path at one side of said portion and adapted to support the lower ends of said sleeves as they are delivered from the feeder, another stationary shelf below said path at the opposite side of said portion and adapted to support the lower ends of said sleeves after they have passed beyond said portion, jaws hinged at their inner ends to the rotor between said fingers, means for automatically moving each jaw downwardly to closed position as it moves above the first-mentioned shelf and for automatically moving each jaw upwardly to open position as it moves above the second-mentioned shelf, the space between the rotor and each jaw as it moves toward closed position being large enough for the jaw to enter and grip a thin section end of a sleeve and being too small for the jaw to grip a thick section end of a sleeve whereby the sleeves which when engaged by the jaw are seated on their thin section ends are dropped into the hopper for redelivery by the feeder to the first-mentioned shelf.

8. A machine according to claim 7 wherein a motor is connected to the rotor for rotating it, and wherein means are provided to permit the rotor to remain stationary while the motor remains energized in the event that a sleeve has not been removed from said other shelf when another sleeve is delivered thereto by the rotor.

9. In a machine for orienting elongated members delivered randomly with a thin-section end up or a thick-section end up; the combination of a delivery shelf and a discharge shelf spaced from each other by a gap, said delivery shelf formed and arranged to support one end of each elongated member delivered thereto, independent pairs of spaced clamp means continuously moving from above said delivery shelf to above said discharge shelf, means for automatically closing each pair of clamp means as it passes above said delivery shelf to engage the upper end of an elongated member on said delivery shelf, each pair of said clamp means being large enough to clamp one of said thin-section ends, and being too small to clamp one of said thick-section ends, whereby unclamped elongated members fall through said gap, means for automatically opening each pair of said clamp means above said discharge shelf, and means for removing said elongated members from said discharge shelf with their thin-section ends facing upwardly.

* * * * *